(12) United States Patent
Yang (10) Patent No.: US 10,734,692 B2
(45) Date of Patent: Aug. 4, 2020

(54) BATTERY COOLANT LOOP PAD FOR ELECTRIC VEHICLES

(71) Applicant: Thunder Power New Energy Vehicle Development Company Limited, Central (HK)

(72) Inventor: Yung-Kang Yang, Taichung (TW)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 50 days.

(21) Appl. No.: 15/864,231

(22) Filed: Jan. 8, 2018

(65) Prior Publication Data

US 2018/0131055 A1    May 10, 2018

Related U.S. Application Data

(63) Continuation of application No. 15/208,807, filed on Jul. 13, 2016, now Pat. No. 9,865,905.
(Continued)

(51) Int. Cl.
*H01M 10/6551* (2014.01)
*H01M 2/10* (2006.01)
(Continued)

(52) U.S. Cl.
CPC ......... *H01M 10/6551* (2015.04); *B60L 50/64* (2019.02); *B60L 58/26* (2019.02);
(Continued)

(58) Field of Classification Search
CPC ........... H01M 10/6551; H01M 10/613; H01M 10/643; H01M 10/653; H01M 10/655;
(Continued)

(56) References Cited

U.S. PATENT DOCUMENTS

2009/0023056 A1* 1/2009 Adams ................ H01M 2/1072
429/120
2009/0139781 A1* 6/2009 Straubel .................. B60L 50/64
180/65.1

(Continued)

FOREIGN PATENT DOCUMENTS

DE    102012000996 A1    7/2013

OTHER PUBLICATIONS

European Examination Report dated May 14, 2018 in the corresponding European application (application No. 16207054.4).

*Primary Examiner* — Jonathan G Jelsma
(74) *Attorney, Agent, or Firm* — Kilpatrick Townsend & Stockton, LLP (57) ABSTRACT

A battery pack for an electric vehicle may include a plurality of battery cells arranged into at least a first row and a second row. The first row may be parallel to the second row. The battery pack may also include a coolant loop with at least one channel through which liquid can flow. The coolant tube may run between the first row and the second row. The battery pack may additionally include a thermal pad comprising a first side and a second side. The first side of the thermal pad may be shaped to conform to the coolant loop and the second side of the thermal pad may be shaped to conform to curvatures of the first row.

14 Claims, 11 Drawing Sheets

Related U.S. Application Data (60) Provisional application No. 62/272,712, filed on Dec. 30, 2015.

(51) Int. Cl.

| | |
|---|---|
| *H01M 10/613* | (2014.01) |
| *H01M 10/6554* | (2014.01) |
| *H01M 10/6567* | (2014.01) |
| *H01M 10/6556* | (2014.01) |
| *H01M 10/6557* | (2014.01) |
| *H01M 10/6568* | (2014.01) |
| *H01M 10/625* | (2014.01) |
| *B60L 58/26* | (2019.01) |
| *B60L 50/64* | (2019.01) |
| *H01M 10/643* | (2014.01) |
| *H01M 10/653* | (2014.01) |
| *H01M 10/655* | (2014.01) |
| *H01M 10/0525* | (2010.01) |
| *F28F 13/00* | (2006.01) |
| *B60L 50/50* | (2019.01) |

(52) U.S. Cl.
CPC ......... *H01M 2/105* (2013.01); *H01M 2/1077* (2013.01); *H01M 2/1083* (2013.01); *H01M 2/1094* (2013.01); *H01M 10/0525* (2013.01); *H01M 10/613* (2015.04); *H01M 10/625* (2015.04); *H01M 10/643* (2015.04); *H01M 10/653* (2015.04); *H01M 10/655* (2015.04); *H01M 10/6554* (2015.04); *H01M 10/6556* (2015.04); *H01M 10/6557* (2015.04); *H01M 10/6567* (2015.04); *H01M 10/6568* (2015.04); *B60L 50/50* (2019.02); *F28F 2013/006* (2013.01); *H01M 2220/20* (2013.01); *Y02T 10/705* (2013.01); *Y02T 10/7005* (2013.01)

(58) Field of Classification Search
CPC ......... H01M 10/6556; H01M 10/6557; H01M 10/6568; H01M 2/105; H01M 2/1077; H01M 2/1094
See application file for complete search history.

(56) References Cited

U.S. PATENT DOCUMENTS

| | | | |
|---|---|---|---|
| 2011/0267778 A1* | 11/2011 | Eckstein | H01M 2/1077 361/704 |
| 2013/0230760 A1* | 9/2013 | Pan | H01M 2/1077 429/120 |

\* cited by examiner

BATTERY COOLANT LOOP PAD FOR ELECTRIC VEHICLES

CROSS-REFERENCES TO RELATED APPLICATIONS

This patent application is a continuation of U.S. Nonprovisional application Ser. No. 15/208,807, filed Jul. 13, 2016, which is nonprovisional of and claims priority to U.S. Provisional Application. No. 62/272,712, filed Dec. 30, 2015, entitled "BATTERY PACKAGING AND INSERT MOLDING FOR ELECTRIC VEHICLES", which is related to the following commonly assigned patent applications. Each of these applications is incorporated herein by reference:

- U.S. Pat. App. No. 62/272,711, filed Dec. 30, 2015, entitled BATTERY PACKAGING AND INSERT MOLDING FOR ELECTRIC VEHICLES.
- U.S. Pat. App. No. 62/272,713, filed Dec. 30, 2015, entitled INTEGRATED BUSBAR AND BATTERY CONNECTION FOR ELECTRIC VEHICLE BATTERY PACKS.
- U.S. Pat. App. No. 62/272,714, filed Dec. 30, 2015, entitled SMART CHARGING SYSTEM FOR ELECTRIC VEHICLE BATTERY PACKS.

BACKGROUND

An electric vehicle uses one or more electric motors powered by electrical energy stored in a rechargeable battery pack. Lithium-based batteries are often chosen for their high power and energy density. In order to ensure that an electric vehicle operates efficiently and safely, the temperature of the battery pack must be maintained within a defined range of optimal temperatures. The coolant system of electric vehicle can be physically extended to the battery pack to remove excess heat, thereby increasing the service life of the battery pack and increasing the distance that can be traveled on a single charge.

As the popularity of electric vehicles increases, efficiency in the manufacturing process will become more important. Processes and devices that decrease the cost of manufacturing battery packs while simultaneously increasing their reliability and safety will be key to meeting customer demands. Specifically, there is a need for processes and devices that ensure reliable electrical connections between individual battery cells, that efficiently cool the battery pack, and that aid in the manufacturing process of assembling the thousands of individual battery cells into modular packs that can be installed and replaced when necessary.

BRIEF SUMMARY

In some embodiments, a battery pack for an electric vehicle may include a plurality of battery cells arranged into at least a first row and a second row. The first row may be parallel to the second row. The battery pack may also include a coolant loop with at least one channel through which liquid can flow. The coolant tube may run between the first row and the second row. The battery pack may additionally include a thermal pad comprising a first side and a second side. The first side of the thermal pad may be shaped to conform to the coolant loop and the second side of the thermal pad may be shaped to conform to curvatures of the first row.

In some embodiments, a method of manufacturing a battery pack for an electric vehicle may include arranging a plurality of battery cells into at least a first row and a second row. The first row may be parallel to the second row. The method may also include placing a coolant loop between the first row and the second row. The coolant loop may include at least one channel through which liquid can flow. The method may additionally include placing a thermal pad between the coolant loop and the first row. The thermal pad may include a first side and a second side. The first side of the thermal pad may be shaped to conform to the coolant loop and the second side of the thermal pad may be shaped to conform to curvatures of the first row.

In various embodiments, one or more of the following features may be included in any combination and without limitation. The battery pack may further include a second thermal pad comprising a first side and a second side, where the first side of the second thermal pad may be shaped to conform to the coolant loop, and the second side of the second thermal pad may be shaped to conform to a curvature of the second row. The method may also include wrapping the coolant loop in an insulator tape that covers the coolant loop. The first side of the thermal pad may be substantially flat. The second side of the thermal pad may include a plurality of semi-circular cutouts. A radius of the semi-circular cutouts may be substantially the same as a radius of each of the plurality of battery cells. Ones of the plurality of battery cells may be mated with ones of the plurality of semi-circular cutouts of the thermal pad. The thermal pad may be comprised of a thermal conductor material. The method may also include applying a molded insert that encompasses the plurality of cells and the coolant loop such that the plurality of cells and the coolant loop are fixed relative to each other. The plurality of battery cells may further be arranged into a third row that is adjacent to the first row, the coolant loop may be curved to be adjacent to the first row and adjacent to the third row, the thermal pad may be inserted between the coolant loop and the first row, and the thermal pad may be inserted between the coolant loop and the third row.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments of devices for applying a thermal pad to a battery pack. A plurality of battery cells can be arranged into a modular pack with integrated coolant loops. In order to fix the individual battery cells in place, a molded insert can also be applied to an injection molding process. In order to simplify the manufacturing process and minimize the length of coolant loop needed for each battery pack, the embodiments described herein also provide a thermal pad between the coolant loops and the individual battery cells. The thermal pad may be comprised of a compressible, elastic, and/or thermally conductive material. The thermal pad may be shaped to conform on one side to the coolant loop, while shaped to conform on the other side to the curvature of the individual battery cells.

Figure 1:
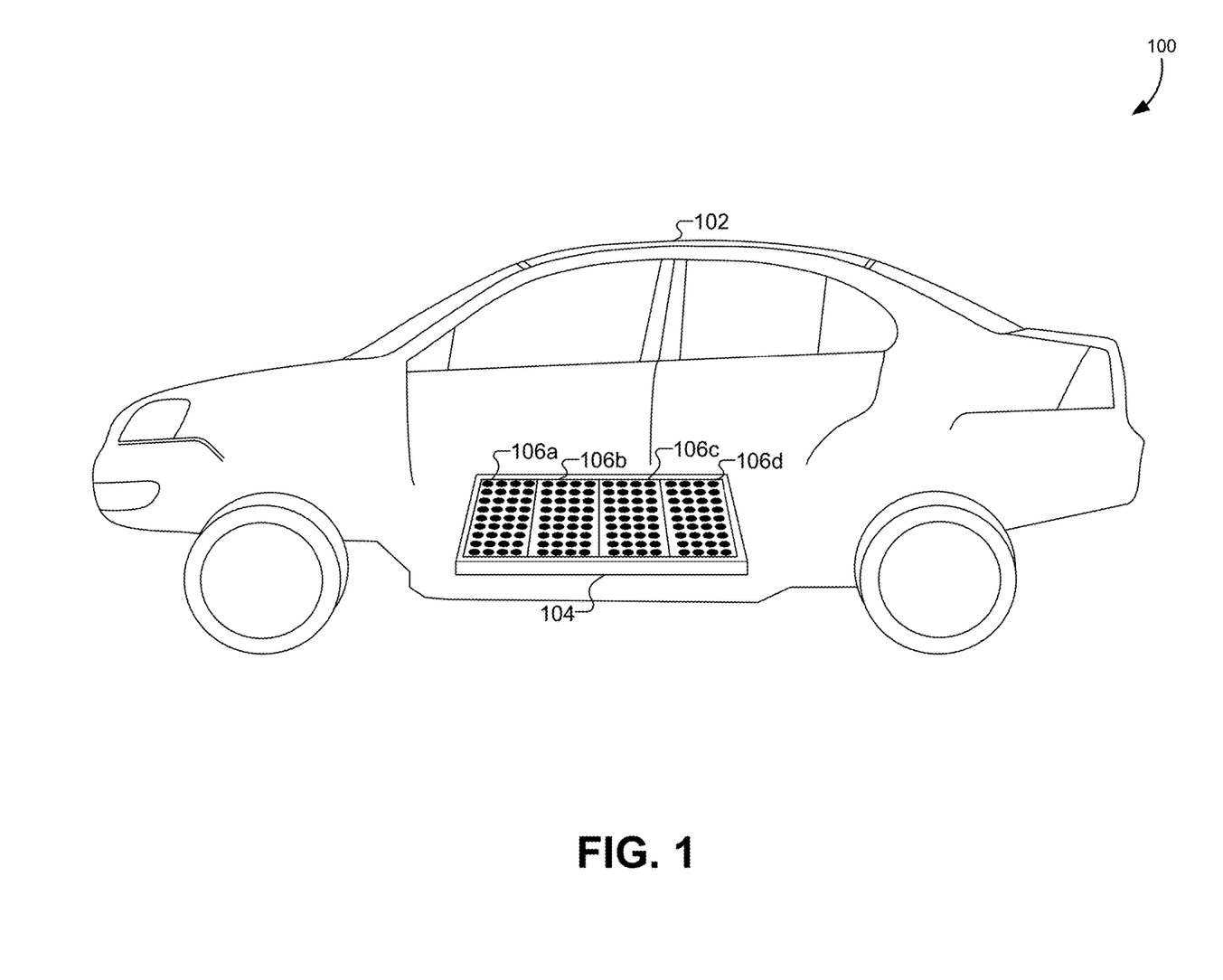
FIG. 1 illustrates a simplified diagram of an electric vehicle with a rechargeable battery system, according to some embodiments.

FIG. 1 illustrates a simplified diagram 100 of an electric vehicle 102 with a rechargeable battery system 104, according to some embodiments. The rechargeable battery system 104 may be comprised of one or more battery packs 106. A battery pack may be comprised of a plurality of individual battery cells that are electrically connected to provide a particular voltage/current to the electric vehicle 102. Depending on the embodiment, the electric vehicle 102 may include hybrid vehicles that operate using both fuel combustion and stored electric power, as well as fully electric vehicles that operate entirely from stored electric power.

The rechargeable battery system 104 represents a major component of the electric vehicle 102 in terms of size, weight, and cost. A great deal of effort goes into the design and shape of the rechargeable battery system 104 in order to minimize the amount of space used in the electric vehicle 102 while ensuring the safety of its passengers. In some electric vehicles, the rechargeable battery system 104 is located under the floor of the passenger compartment as depicted in FIG. 1. In other electric vehicles, the rechargeable battery system 104 can be located in the trunk or in the hood areas of the electric vehicle.

While a smaller number of larger battery cells could be more energy-efficient, the size and cost of these larger batteries are prohibitive. Furthermore, larger batteries require more contiguous blocks of space in the electric vehicle 102. This prevents larger batteries from being stored in locations such as the floor of the passenger compartment as depicted in FIG. 1. Therefore, some embodiments use a large number of smaller battery cells that are coupled together to generate electrical characteristics that are equivalent to single larger cells. The smaller cells may be, for example, the size of traditional AA/AAA batteries, and may be grouped together to form a plurality of battery packs 106. Each battery pack may include a large number of individual battery cells. In one embodiment, 700 individual lithium-ion batteries are joined together to form a single battery pack 106a, and the rechargeable battery system 104 may include four battery packs 106, eight battery packs, ten battery packs, sixteen battery packs, and/or the like, connected in parallel or series until the electrical requirements of the electric vehicle 102 are satisfied. The individual battery cells included in each battery pack 106 may total in the thousands for a single electric vehicle 102.

Figure 2:
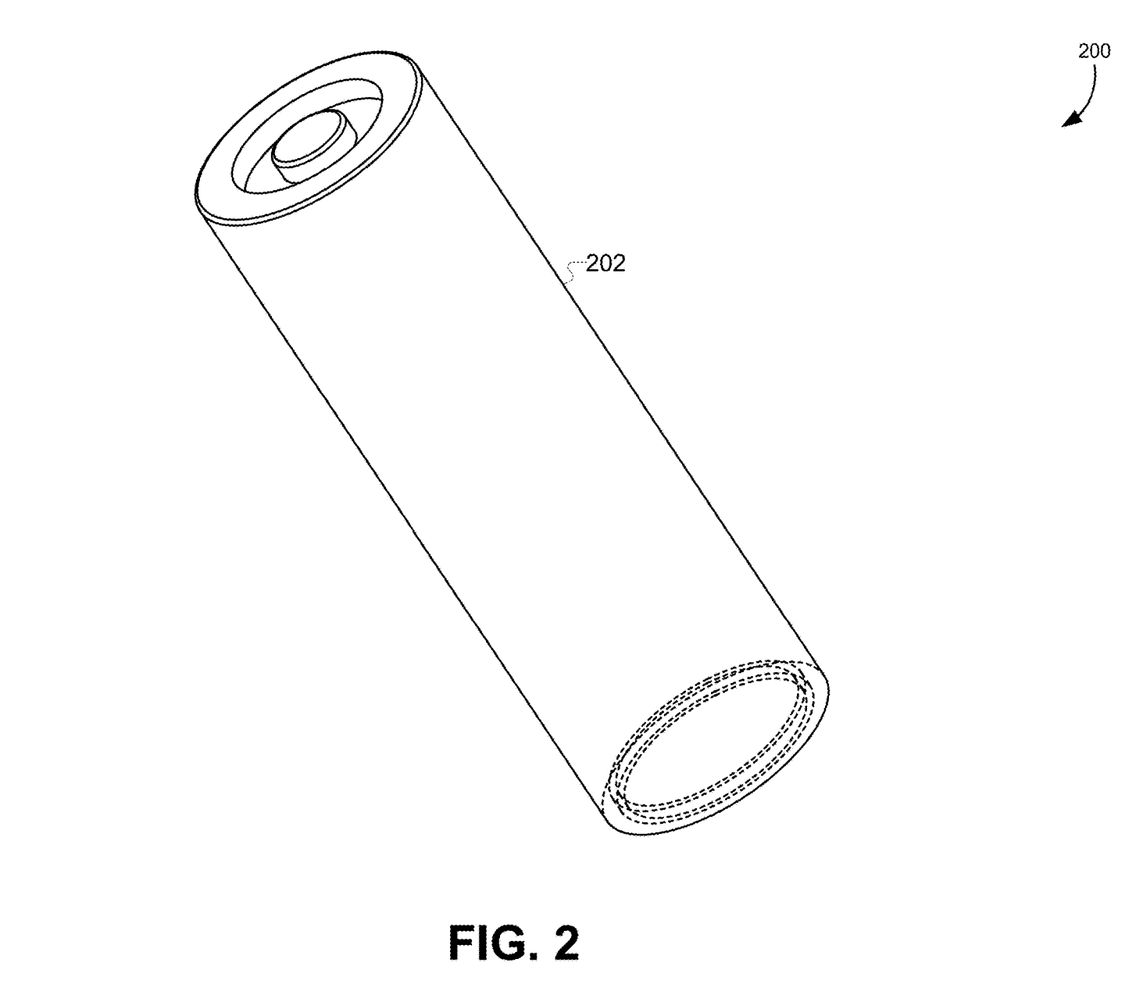
FIG. 2 illustrates a lithium-based battery that may be used in electric vehicles, according to some embodiments.

FIG. 2 illustrates a diagram 200 of a lithium-based battery 202 that may be used in electric vehicles, according to some embodiments. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and approximately 45 g.

Figure 3:
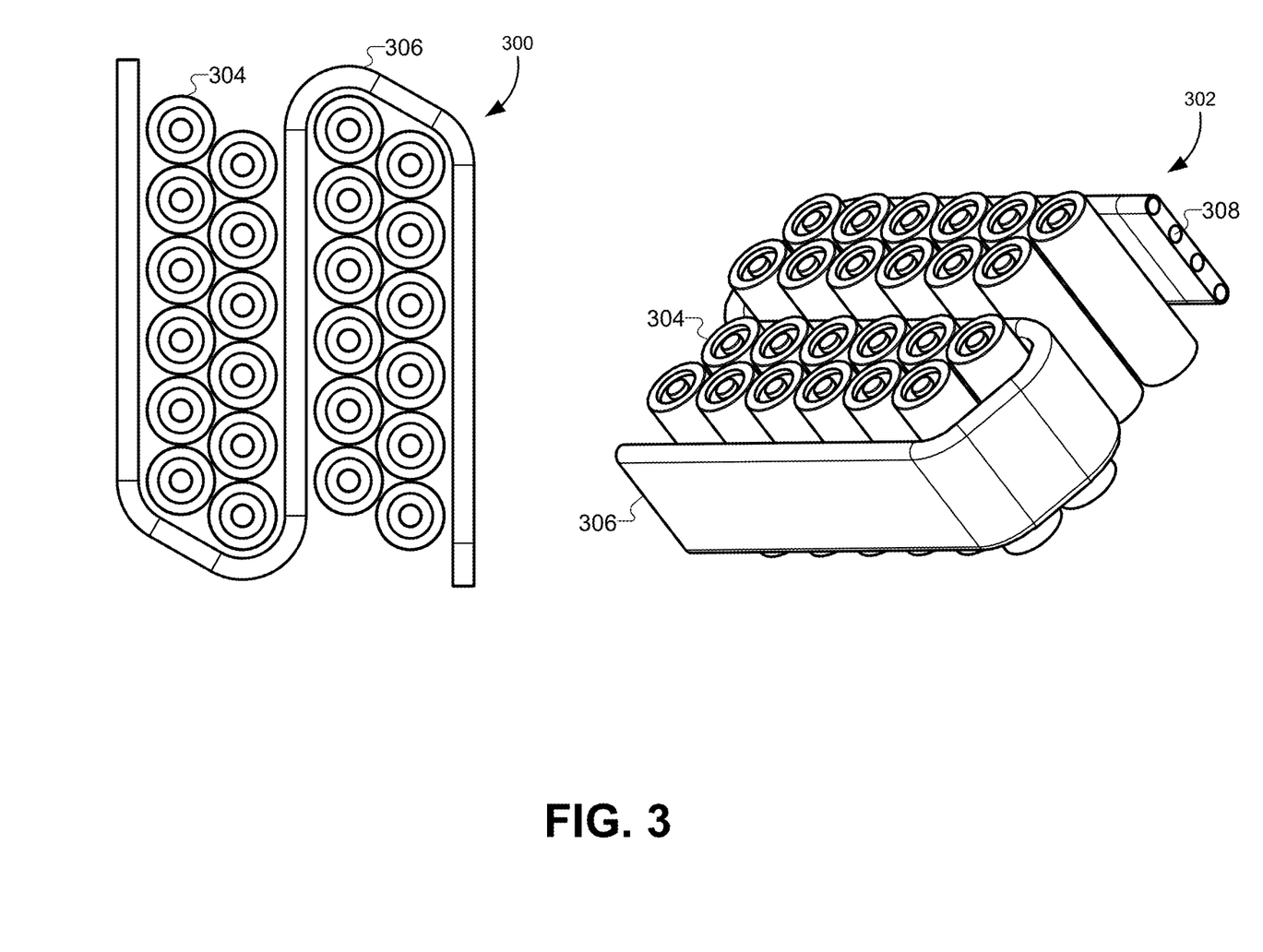
FIG. 3 illustrates a battery pack with a coolant loop, according to some embodiments.

FIG. 3 illustrates a top view 300 and an isometric view 302 of a battery pack 304 with a coolant loop 306, according to some embodiments. The battery pack 304 depicted in FIG. 3 is greatly simplified from an actual battery pack that would be used in electric vehicle. The number of individual battery cells and cell rows has been greatly reduced in order to describe the elements of the present invention simply and clearly. It will be understood that actual battery packs would include many more individual battery cells and more complicated routing of the coolant loop 306.

The individual battery cells in the battery pack 304 are linearly arranged in a series of rows, with each individual battery cell being adjacent to another battery cell within the row. In some embodiments, there will be no appreciable gap between the individual battery cells within a single row. In order to maximize the number of individual battery cells per unit volume, adjacent rows of battery cells are offset by approximately the radius of one individual battery cell. Adjacent rows are then placed next to each other in the offset position depicted in FIG. 3 such that each individual battery cell in a first row is adjacent to or contacting two individual battery cells in a second row. In some embodiments (not shown) three or more rows are placed adjacent to each other with no appreciable gaps therebetween.

The battery pack 304 of FIG. 3 includes pairs adjacent rows separated by a coolant loop 306. The electric vehicle may be configured to pump liquid coolant through the coolant loop 306 in order to transfer heat from the battery pack 304 to a radiator or other heat exchange system. The coolant loop 306 may include one or more coolant tubes 308 through which liquid coolant may be circulated. In some embodiments, the electric vehicle may use a dedicated coolant loop for the battery pack 304, while other embodiments may utilize an existing engine coolant system. In some embodiments, the coolant loop 306 may also be coupled to a heating system, such that the battery pack 304 can be heated when extreme weather causes the ambient temperature to drop below a preferred operating temperature range of the individual battery cells.

The coolant loop 306 may be routed around rows of individual battery cells in the battery pack 304. Each battery pack may include an inlet and an outlet for the coolant loop 306. In some embodiments, the coolant loop may be wrapped around pairs of rows of individual battery cells, such that each battery cell is adjacent to at least a portion of the coolant loop. Prior to this disclosure, a coolant loop was disposed between two adjacent rows of battery cells, where the coolant loop was shaped to conform to the battery cells. In this solution, the coolant loop must be bent or formed until it has a wavy profile or a scalloped profile that conforms with the contours of the round individual battery cells in each row. An example of this type of coolant loop is depicted in U.S. Pat. No. 8,541,127. Although this type of solution attempts to maximize the heat transfer from the battery cells to the coolant loop, it does compel a measure of unnecessary cost on the manufacturing process. The coolant loop must be formed or bent before it can be installed, adding to the manufacturing time. This type of solution also increases the length of the coolant loop that must be used for each battery pack. By increasing the length of the coolant loop, more powerful pumps must be used to pump coolant through the longer length. Additionally, more coolant must be used and run through a heat exchanging apparatus in order to cool the battery pack.

Figure 4:
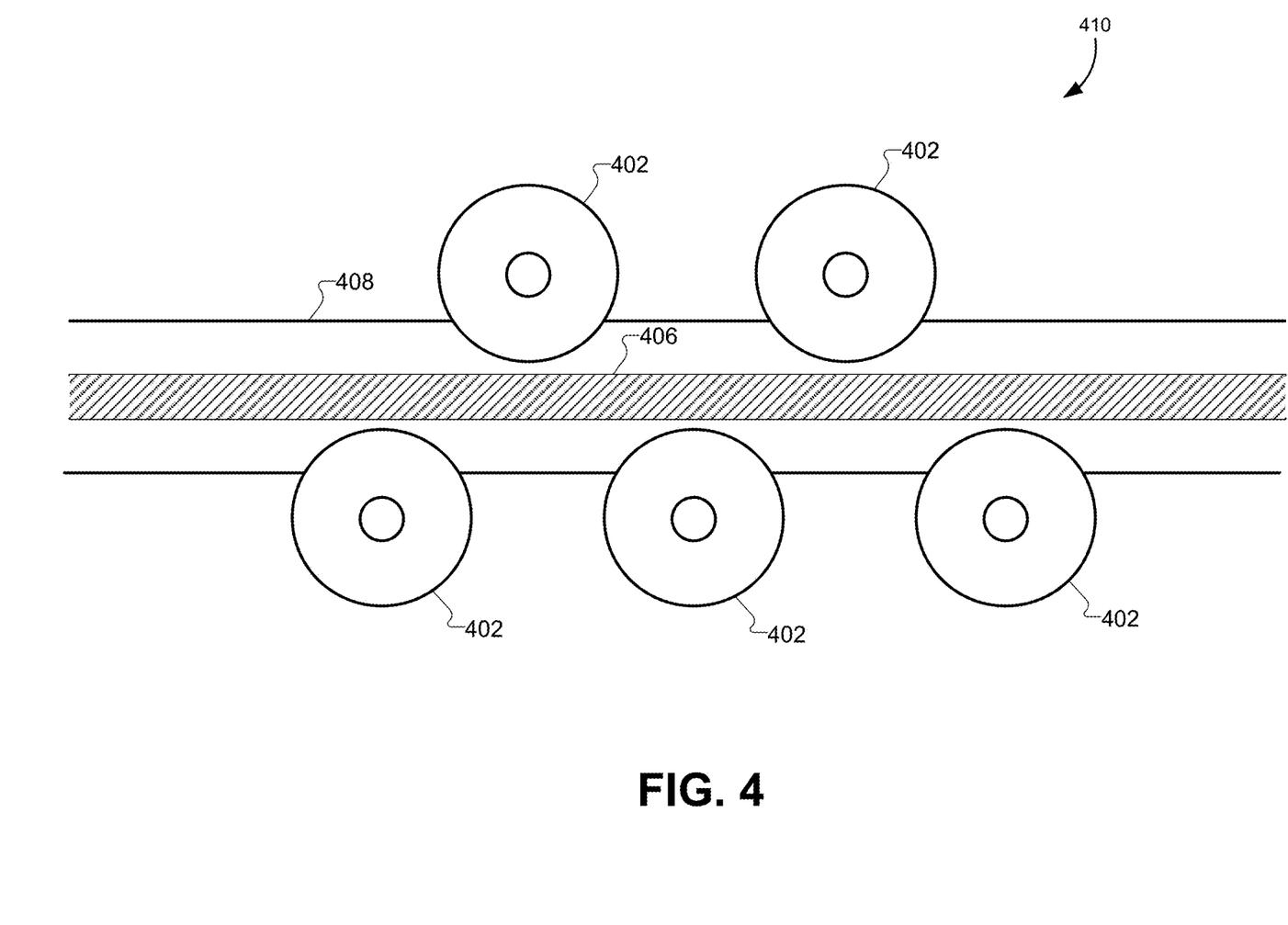
FIG. 4 illustrates a top view of a coolant loop disposed between two adjacent rows a battery cells with a pad to conform to the battery cells.

FIG. 4 illustrates a top view of a coolant loop disposed between two adjacent rows a battery cells with a pad to conform to the battery cells 402. In contrast to prior solutions, the arrangement in FIG. 4 does not require the coolant loop 406 to be formed or bent. Instead, a thermal pad 408 is placed around the coolant loop 406 such that the coolant loop 406 can remain substantially straight while the thermal pad 408 thermally couples the coolant loop 406 to the battery cells 402 by conforming to the shape and/or curvature of the battery cells 402.

Figure 5:
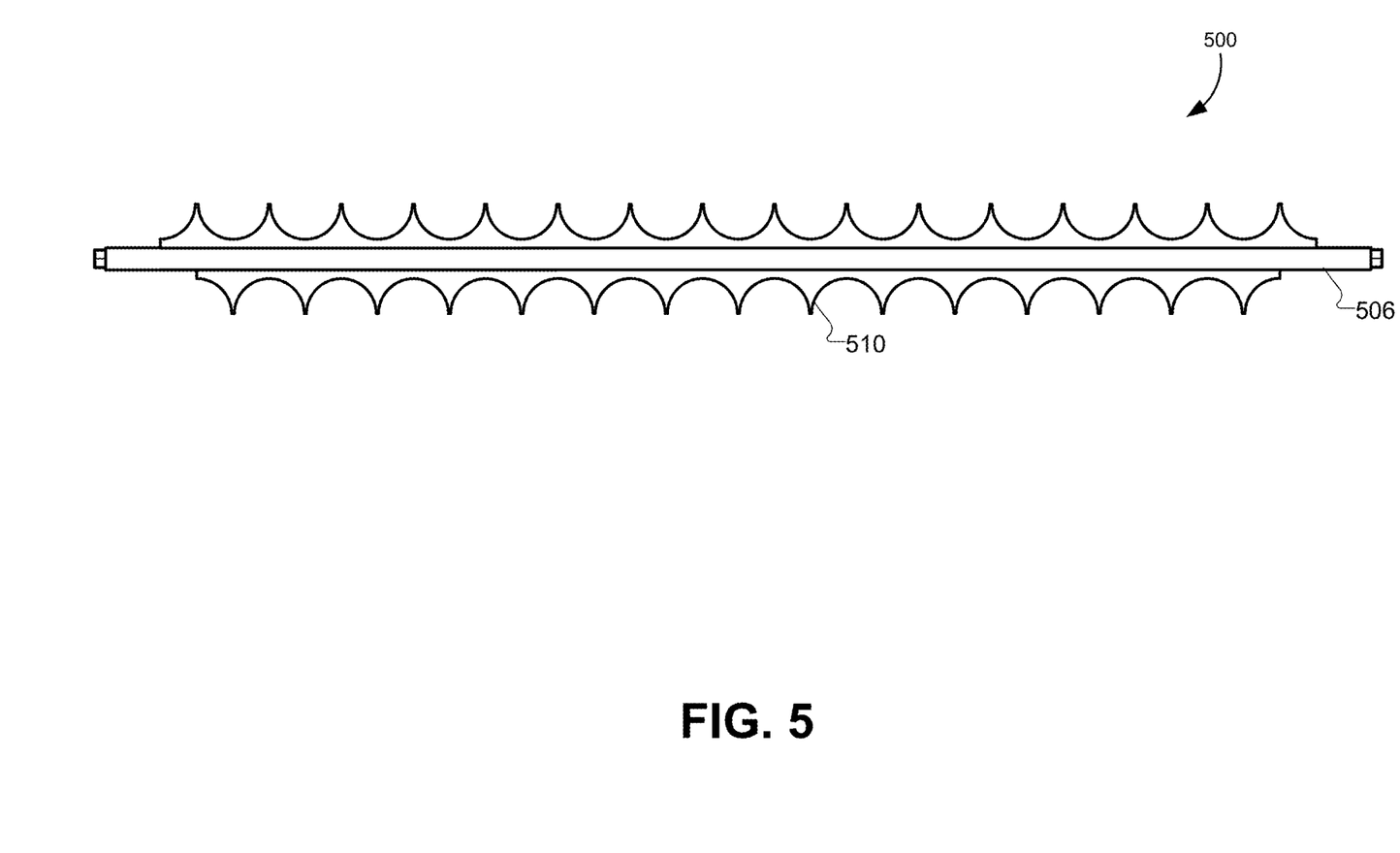
FIG. 5 illustrates a coolant loop with a thermal pad that is shaped to conform to the battery cells.

FIG. 5 illustrates a coolant loop 506 with a thermal pad 510 that is shaped to conform to the battery cells. In this embodiment, the coolant loop 506 is allowed to remain straight, and the thermal interface between the coolant loop 506 and individual battery cells is formed through the use of a thermal pad 510. The thermal pad may comprise a first side that is substantially flat and conforms to the vertical profile of the coolant loop 506. The thermal pad 510 may be bonded to the coolant loop 506 using epoxies, adhesives, tape, and/or the like. In some embodiments, the thermal pad 510 may be manufactured in the form of the sleeve with an interior surface that conforms to the shape of the coolant loop 506. The coolant loop 506 may be inserted into the thermal pad 510 such that the internal surface of the thermal pad 510 is in contact with the coolant loop 506. The thermal pad 510 may be formed from a material with at least some elastic properties, thereby causing the thermal pad 510 to remain in close contact with the coolant loop 506.

The thermal pad 510 may include a second surface, opposite the first surface. The second, or external, surface of the thermal pad 510 may include a scalloped profile is depicted in FIG. 5. The scalloped profile may be formed through successive semi-circle cutouts of the thermal pad 510. During manufacturing, the thermal pad 510 may be molded to have a flat first side and a scalloped second side. Alternatively, the thermal pad 510 may be manufactured in a substantially rectangular shape, and the semi-circle cutouts may be removed from the rectangular shape. The semi-circle cutouts may be shaped to conform to a curvature of each individual battery cell. For example, the semicircular cutouts may have a radius that is substantially similar to a radius of the individual battery cells described above.

In some embodiments, the thermal pad 510 may be manufactured as a substantially rectangular shape without the semi-circle cutouts. In these embodiments, the thermal pad 510 may be manufactured from a compressible material with elastic properties. When the coolant loop 506 is installed between successive rows of individual battery cells, the thermal pad 510 can be compressed between the coolant loop 510 and the individual battery cells. Because of the elastic properties of the thermal pad 510, it will conform to both the surface of the coolant loop 506 as well as the curvature of the individual battery cells by virtue of the compressive force applied between the battery cells and the coolant loop 506.

Figure 6:
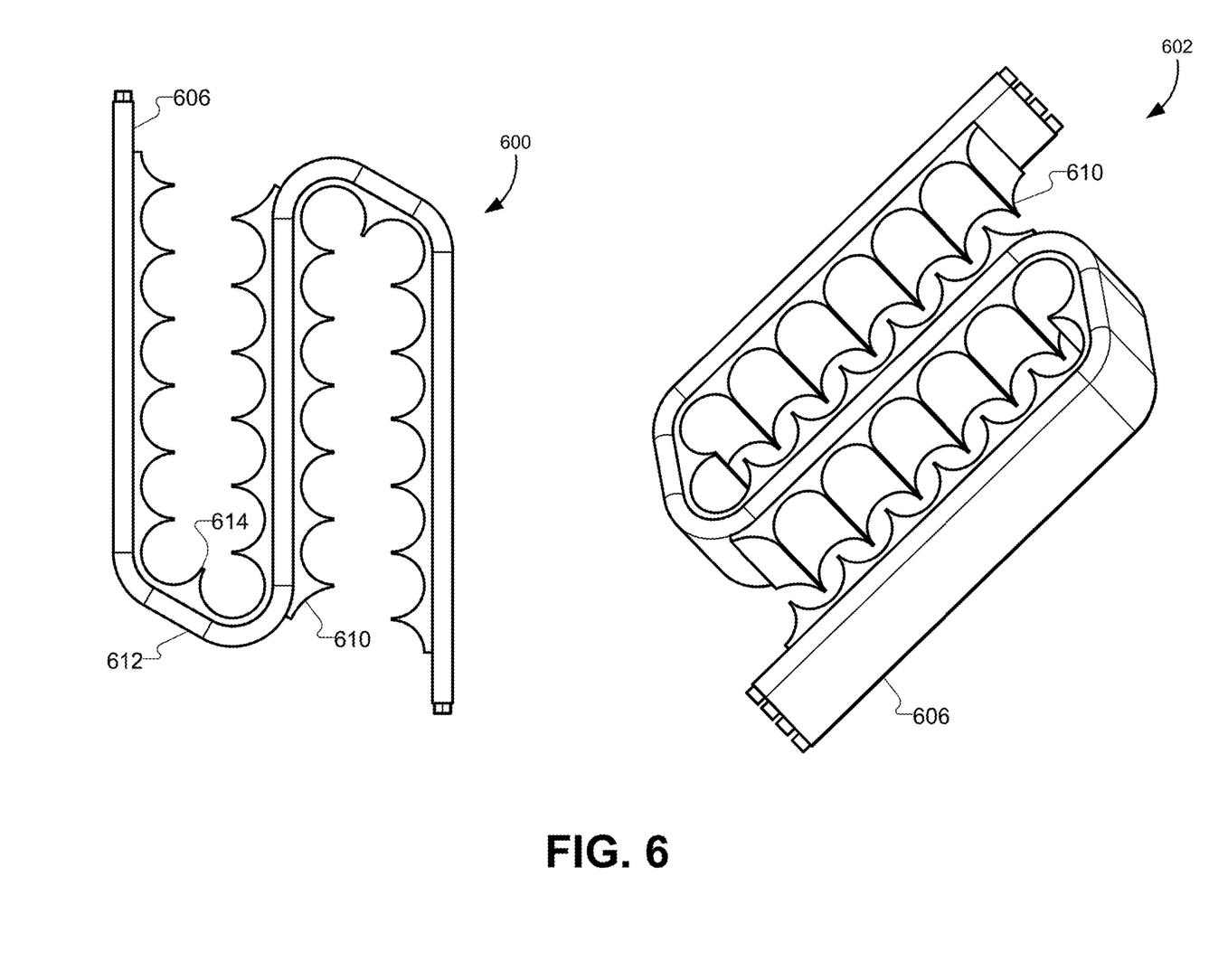
FIG. 6 illustrates a coolant loop with a thermal pad where the coolant loop is shaped to wrap around adjacent rows of battery cells.

FIG. 6 illustrates a top view 600 and an isometric view 602 of a coolant loop 606 with a thermal pad 610 where the coolant loop is shaped to wrap around adjacent rows of battery cells. In this embodiment, the thermal pad 510 and coolant loop 506 of FIG. 5 is depicted in a curved state such that it can be routed between successive rows of individual battery cells. Sections 612 of the coolant loop 606 that are not in contact with individual battery cells—such as on the edges of a battery pack—can be left free of the thermal pad 610. On the interior curves 614 of the coolant loop 606, the thermal pad 610 can conform with the curvature of the coolant loop 606 as it is routed around the ends of the rows of individual battery cells. For manufacturing purposes, the entire coolant loop 606 can have the thermal pad 610 applied prior to installation. After the coolant loop 606 is routed through the individual rows of battery cells, portions of thermal pad 610 that cover sections 612 of the coolant loop 606 that are not in contact with individual battery cells can be removed.

Figure 7A:
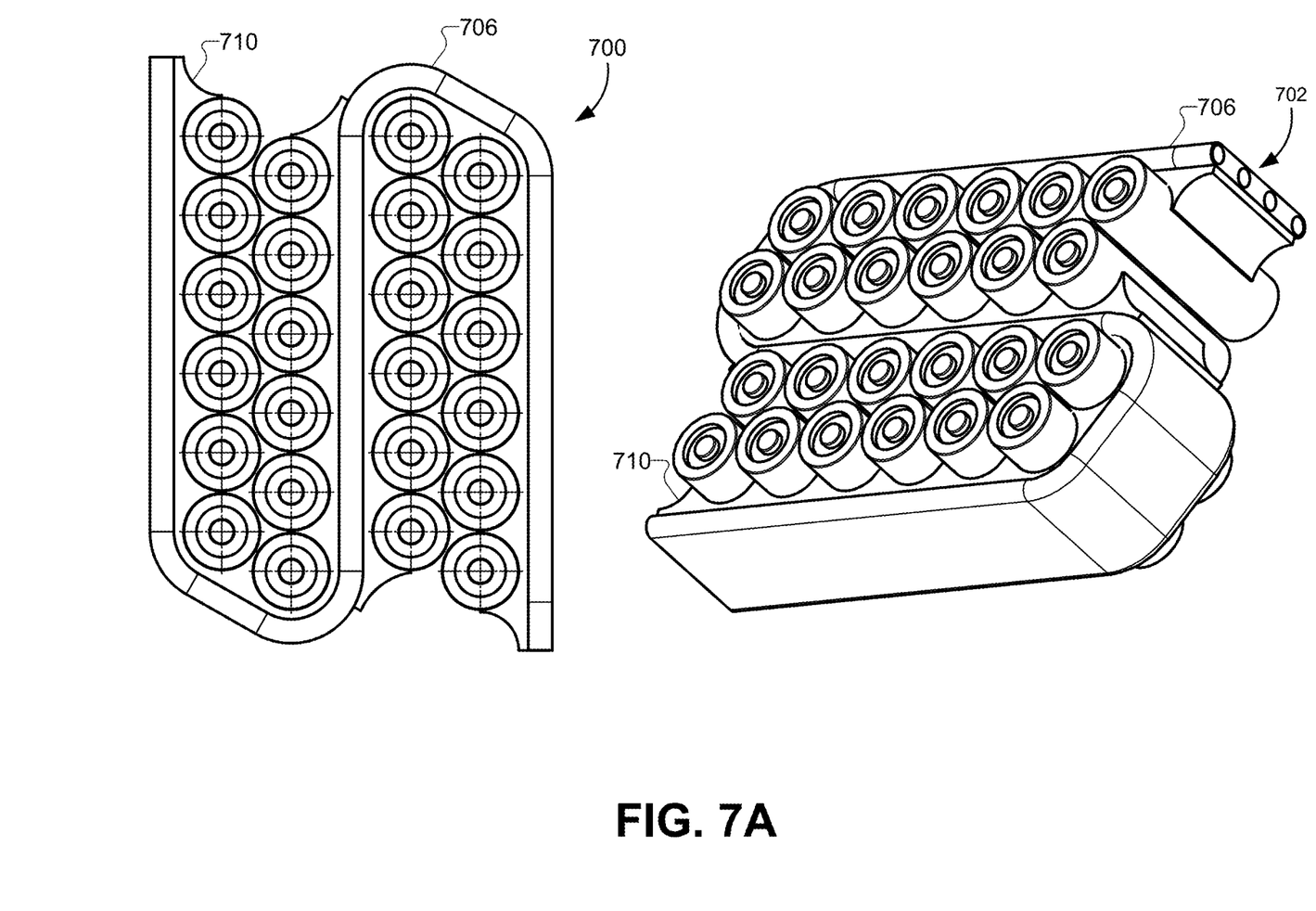
FIG. 7A illustrates a coolant loop with a thermal pad that is wrapped around adjacent rows of battery cells.

FIG. 7A illustrates a top view 700 and an isometric view 702 of a coolant loop 706 with a thermal pad 710, according to some embodiments. Instead of needing to crimp the coolant loop 406 into a wavy or scalloped pattern in order to conform to the curvature of the individual battery cells in the battery pack as shown in FIG. 4, a thermal pad 410 may be inserted between the coolant loop 406 and the individual battery cells. The thermal pad can be constructed from any thermally conductive material and can be pre-formed with scalloped edges on one side that conform to the curvature of the individual battery cells, and with a straight edge on the other side to bond with the coolant loop 406. As described above, the battery pack depicted in FIG. 7 is greatly simplified, having only four rows of individual battery cells. This is done merely for clarity in showing how the thermal pad 710 and coolant loop 707 can be assembled with the individual battery cells to form a battery pack. It will be understood that battery packs in actual electric vehicles will include many hundreds of individual battery cells and many feet of coolant loop.

Figure 7B:
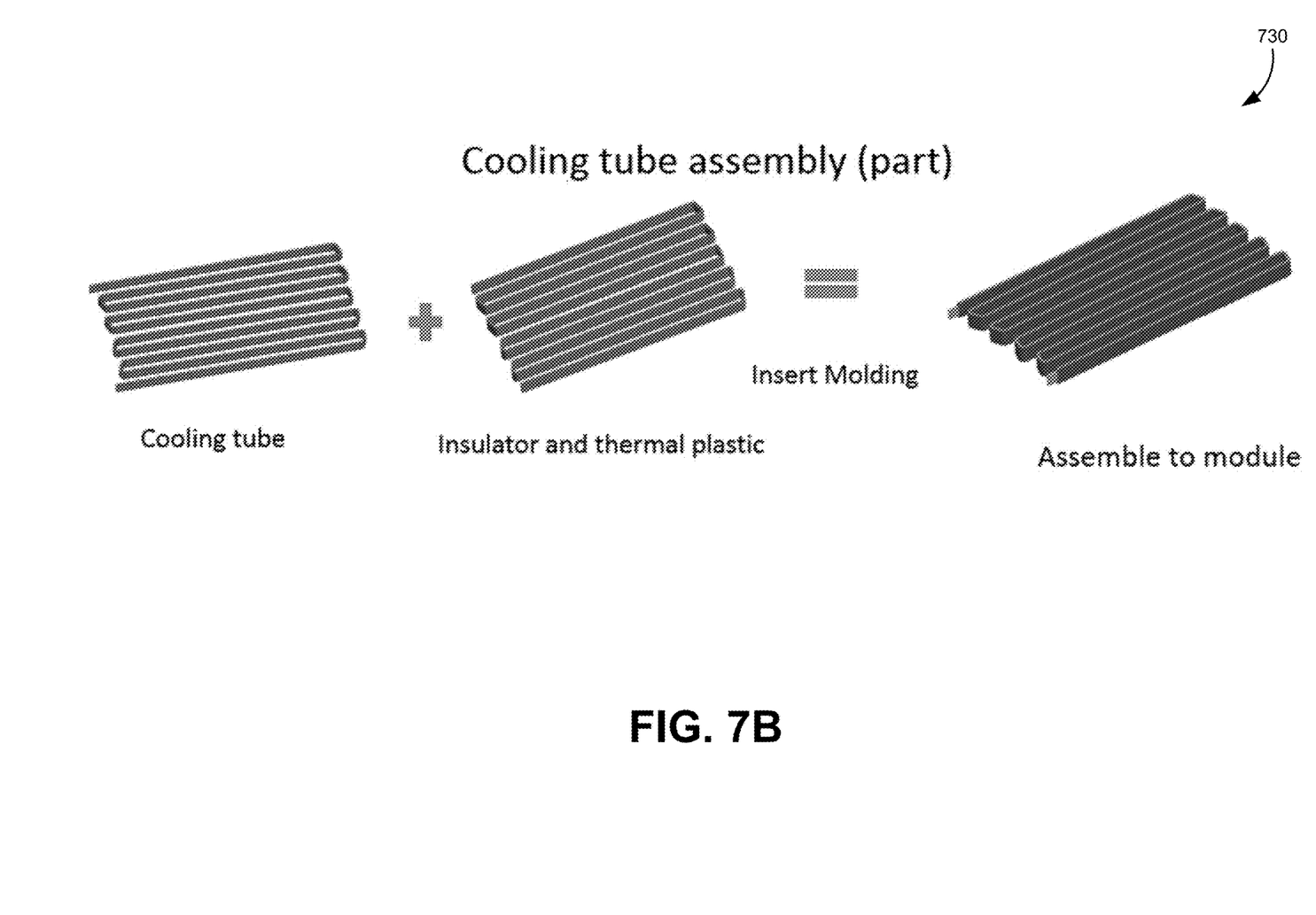
FIG. 7B illustrates a process for wrapping a coolant loop with a thermal pad, according to some embodiments.

FIG. 7B illustrates a process 730 for wrapping a coolant loop with a thermal pad, according to some embodiments. The process may begin with a coolant loop, or cooling tube. An insulator tape may be added to the coolant loop. A thermal plastic may then be added to form the thermal pad, and the entire assembly can then be routed through the battery cells. In some embodiments, the battery cells may be placed in a fixture or injection mold in order to hold them in place, and the coolant loop assembly can then be routed through the battery cells while they are stationary. As described elsewhere in this disclosure, a molded insert may then be added to the battery pack to hold each component of the assembly in place.

Figure 8:
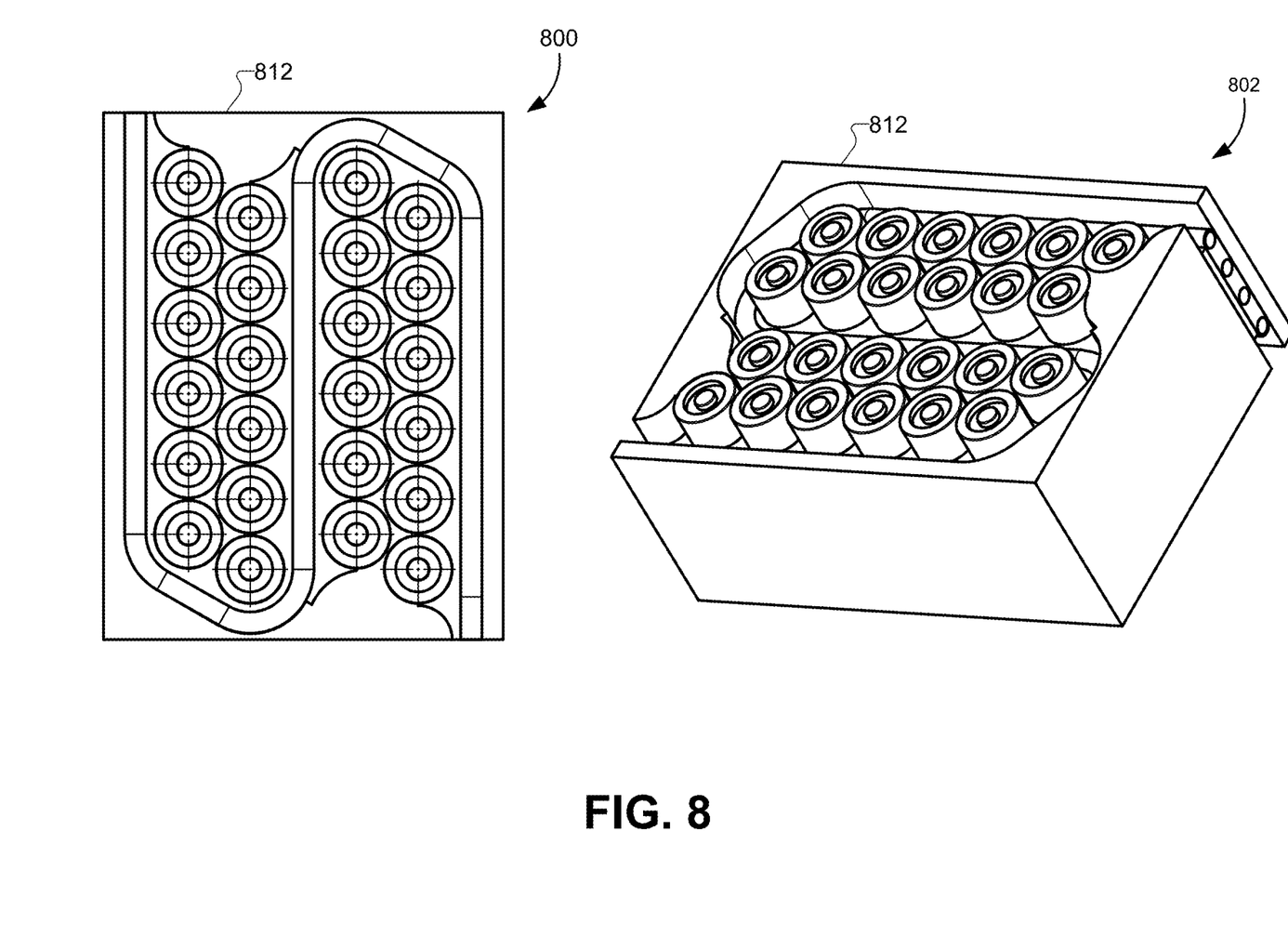
FIG. 8 illustrates a battery pack with a full molded insert according to some embodiments.

FIG. 8 illustrates a top view 800 and an isometric view 802 of a battery pack with a partial molded insert 812, according to some embodiments. Applying a solid molding around the coolant loop and the individual battery cells in a battery pack serves to transform these individual components into a solid battery pack that can withstand the rigors of sustained vehicle use. The solid molding ensures that the individual battery cells remain in place and the electrical connections are not disturbed by vibration and movement. The solid molding also forms a modular unit that can be moved, installed, and/or replaced easily during the manufacturing process of the rechargeable battery system and the service life of the electric vehicle. In one exemplary embodiment, 750 individual battery cells can be combined with one or more current loops to form a battery pack that is encased in a solid molding. The partial molded insert 812 depicted in FIG. 8 is referred to as "partial" because it is only applied around the exterior of the battery pack. In some embodiments, this can be sufficient to form a solid battery pack that can be reliably installed and used in an electric vehicle. This may also leave the pad and the individual battery cells exposed such they can be replaced if needed.

Figure 9:
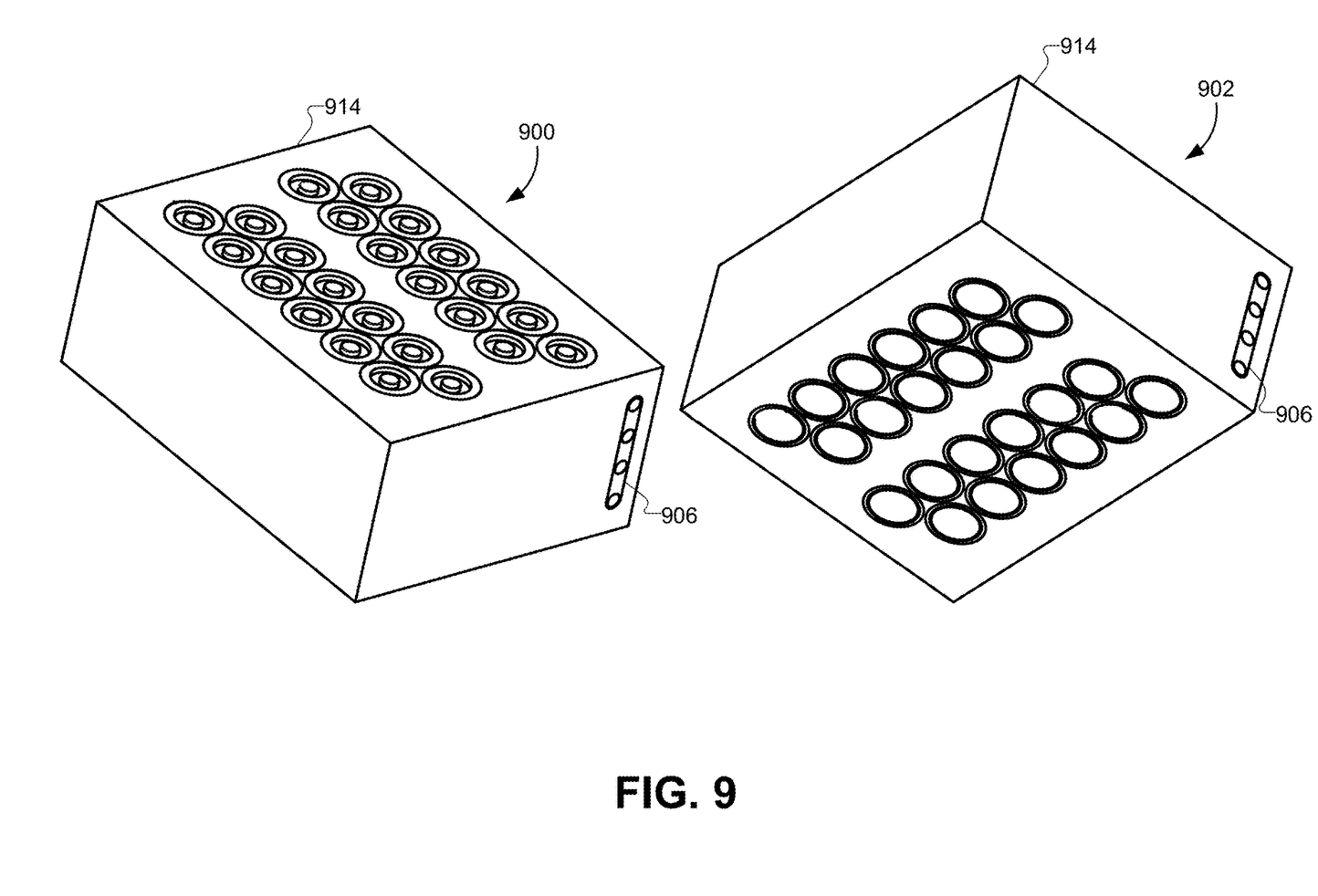
FIG. 9 illustrates a battery pack with a molded insert, according to some embodiments.

FIG. 9 illustrates a top isometric view 900 and a bottom isometric view 902 of a battery pack with a full molded insert 914 according to some embodiments. In this more typical embodiment, the molding material described above can be injected into an injection mold and allowed to flow around and through any cavities between the individual battery cells and any components related to the coolant loop 906. In some embodiments, the injection mold may include cavities in the mold that allow the coolant loop 906 to exit the molded insert 914, along with any electronics or electrical connections that connect the battery pack with the rest of the rechargeable battery system (not shown). In this embodiment, the full molded insert 914 is applied such that it is level with the top of the individual battery cells. The full molded insert 914 in this embodiment fully covers the coolant loop 906 and the thermal pad. However, the full molded insert 914 does not cover the tops of individual battery cells or the bottoms of the individual battery cells. Instead, these areas of the individual battery cells are left exposed such that electrical connections can be made between individual battery cells after the molded insert is applied. In other embodiments (not shown), the molded insert 716 does not extend all the way to the top and/or bottom terminals of the battery pack. Unlike the embodiments of FIG. 9, the molding material is allowed to flow into cavities between the individual battery cells and/or over the coolant loop and the thermal pad. However, the injection mold is cast with cavities for the individual battery cells such that a portion of the top terminal and a portion of the bottom terminal are left exposed. In some embodiments, the exposed portion of the individual battery cells may be between 1 mm and 15 mm. The amount of each individual battery cell exposed may differ between the top and bottom portions of the individual battery cells. By leaving a portion of the individual battery cells exposed, some types of electrical connections to the individual battery cells may be more easily applied.

Figure 10:
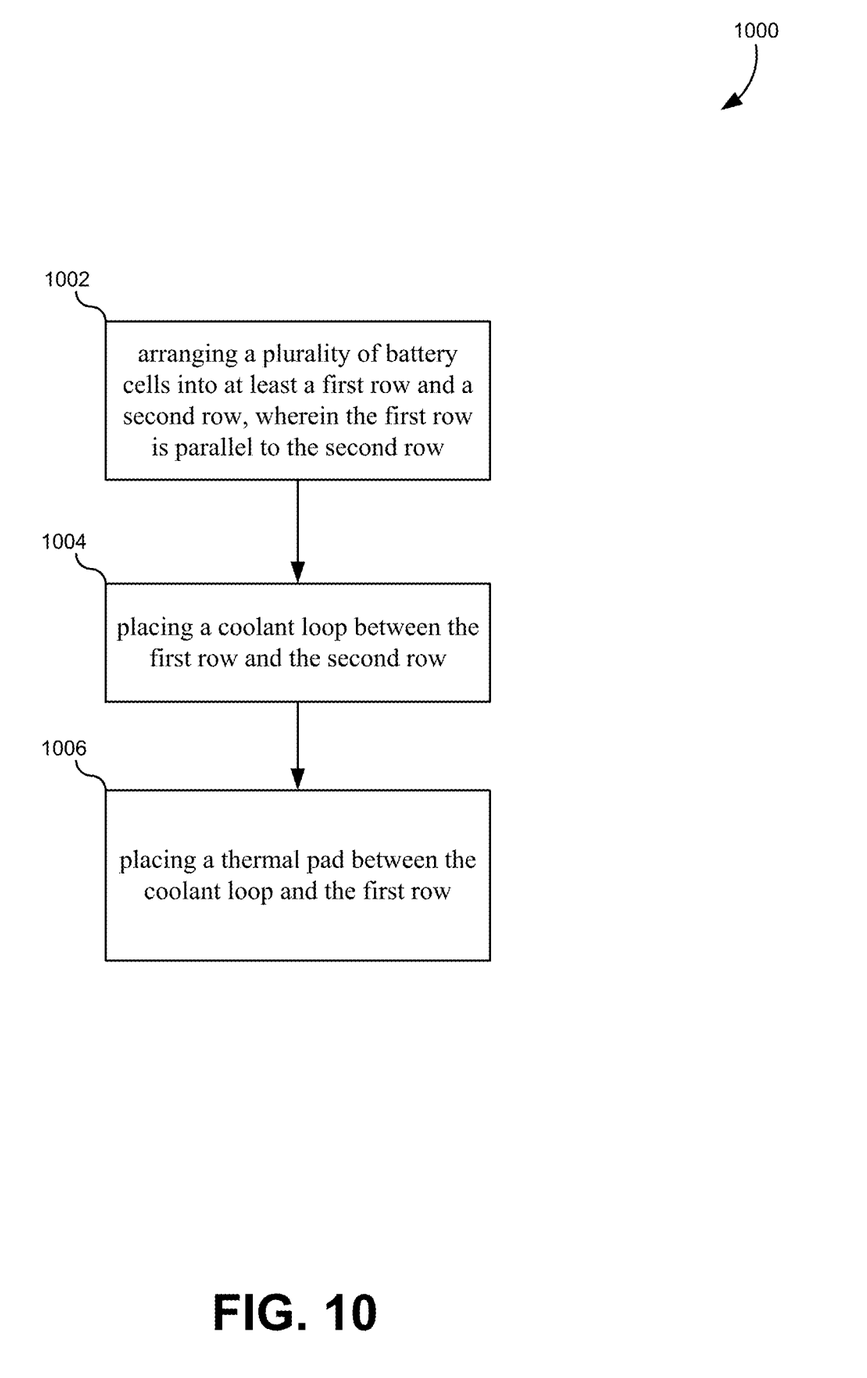
FIG. 10 illustrates a flowchart of a method of manufacturing a battery pack with a thermal pad, according to some embodiments.

FIG. 10 illustrates a flowchart of a method of manufacturing a battery pack with a thermal pad, according to some embodiments. The method may include arranging a plurality of battery cells into at least a first row and a second row (1002). In some embodiments, the first row may be parallel to the second row. Each of the individual battery cells may have a similar radius. The method may also include placing a coolant loop between the first row in the second row (1004). The coolant loop may include at least one channel through which liquid (e.g., coolant, antifreeze, etc.) may flow. In some embodiments, the coolant loop may include two or more channels. The channels may have a square, circular, or rectangular cross-section. The coolant loop itself may have a cross-section with straight parallel edges and rounded ends. The coolant loop may include an insulator tape that is wrapped around the coolant loop before any thermal pad is applied. The battery pack may also include a molded insert that encompasses the plurality of cells and the coolant loop such that the plurality of cells and the coolant loop are fixed relative to each other.

The method may further include placing a thermal pad between the coolant loop and the first row of battery cells (1006). In some embodiments, a second thermal pad may also be applied between the coolant loop in the second row. The thermal pad may have a first side that is shaped to conform to the coolant loop. The first side may be substantially flat. The thermal pad may also have a second side that is shaped to conform to curvatures of the first row. The second side may include a plurality of semi-circular cutouts. Each of the semi-circular cutouts may have a radius that is substantially the same (e.g., less than 5 mm difference) as the radius of the individual battery cells. The thermal pad may be comprised of a thermal conductor. The thermal pad may also be manufactured using a material that is compressible with elastic properties.

In some embodiments, the plurality of battery cells may be further arranged into a third row that is adjacent to and parallel to the first row. The coolant loop may be curved to be adjacent to the first row and adjacent to the third row, and the thermal pad may be inserted between the coolant loop and the first row and also between the coolant loop and the third row. For example, the embodiment of FIG. 7 illustrates how the coolant loop and the thermal pad can be "wrapped around" two parallel and adjacent rows of battery cells.

It should be appreciated that the specific steps illustrated in FIG. 10 provide particular methods of providing a thermal pad for a battery pack for an electric vehicle according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A battery pack for an electric vehicle, the battery pack comprising:
    a plurality of battery cells arranged into at least a first row and a second row;
    a coolant loop wherein a first portion of the coolant loop runs between the first row and the second row perpendicular to a long axis of each the plurality of battery cells, wherein the first portion of the coolant loop comprises:
        a first side facing the first row; and
        a second side facing the second row;
    a first flexible, compressible thermal pad that is bonded to and can move with the coolant loop, the first thermal pad having a first side and a second side, wherein the first side of the first thermal pad is substantially flat to conform to the first side of the first portion of the coolant loop and the second side of the first thermal pad comprises a first plurality of semi-circular cutouts that are shaped to conform to curvatures of the plurality of batteries in the first row without completely encircling the plurality of battery cells in the first row; and
    a second flexible, compressible thermal pad that is bonded to and can move with the coolant loop, the second thermal pad having a first side and a second side, wherein the first side of the second thermal pad is substantially flat to conform to the second side of the first portion of the coolant loop and the second side of the second thermal pad comprises a second plurality of semi-circular cutouts that are shaped to conform to curvatures of the plurality of batteries in the first row without completely encircling the plurality of battery cells in the second row.

2. The battery pack of claim 1, further comprising an insulator tape that covers the coolant loop.

3. The battery pack of claim 1, wherein a radius of the semi-circular cutouts is substantially the same as a radius of each of the plurality of battery cells.

4. The battery pack of claim 1, wherein ones of the plurality of battery cells are mated with ones of the first plurality of semi-circular cutouts of the thermal pad.

5. The battery pack of claim 1, wherein the first thermal pad is comprised of a thermal conductor.

6. The battery pack of claim 1, further comprising a molded insert that encompasses the plurality of cells and the coolant loop such that the plurality of cells and the coolant loop are fixed relative to each other.

7. The battery pack of claim 1, wherein:
    the plurality of battery cells are further arranged into a third row that is adjacent to the first row;
    the coolant loop is curved to be adjacent to the first row and adjacent to the third row; and
    the first thermal pad is inserted between the coolant loop and the first row and between the coolant loop and the third row.

8. A method of manufacturing a battery pack for an electric vehicle, the method comprising:
    arranging a plurality of battery cells into at least a first row and a second row;
    placing a first portion of a coolant loop between the first row and the second row perpendicular to a long axis of each the plurality of battery cells, wherein the first portion of the coolant loop comprises:
        a first side facing the first row; and
        a second side facing the second row;
    placing a first flexible, compressible thermal pad that is bonded to and can move with the coolant loop between the coolant loop and the first row, the first thermal pad having a first side and a second side, wherein the first side of the first thermal pad is substantially flat to conform to the first side of the first portion of the coolant loop and the second side of the first thermal pad comprises a first plurality of semi-circular cutouts that are shaped to conform to curvatures of the plurality of batteries in the first row without completely encircling the plurality of battery cells in the first row; and
    placing a second flexible, compressible thermal pad that is bonded to and can move with the coolant loop between the coolant loop and the first row, the second thermal pad having a first side and a second side, wherein the first side of the second thermal pad is substantially flat to conform to the second side of the first portion of the coolant loop and the second side of the second thermal pad comprises a second plurality of semi-circular cutouts that are shaped to conform to curvatures of the plurality of batteries in the first row without completely encircling the plurality of battery cells in the first row.

9. The method of claim 8, further comprising wrapping the coolant loop in an insulator tape that covers the coolant loop.

10. The method of claim 8, wherein a radius of the semi-circular cutouts is substantially the same as a radius of each of the plurality of battery cells.

11. The method of claim 8, wherein ones of the plurality of battery cells are mated with ones of the first plurality of semi-circular cutouts of the first thermal pad.

12. The method of claim 8, wherein the first thermal pad is comprised of a thermal conductor material.

13. The method of claim 8, further comprising applying a molded insert that encompasses the plurality of cells and the coolant loop such that the plurality of cells and the coolant loop are fixed relative to each other.

14. The method of claim 8, wherein:
    the plurality of battery cells are further arranged into a third row that is adjacent to the first row;
    the coolant loop is curved to be adjacent to the first row and adjacent to the third row; and the first thermal pad is inserted between the coolant loop and the first row and between the coolant loop and the third row.

* * * * *